Dec. 5, 1933. H. E. WARREN 1,938,411
FREQUENCY CONTROL APPARATUS
Filed March 28, 1933

Inventor:
Henry E. Warren,
by Charles E. Tullar
His Attorney.

Patented Dec. 5, 1933

1,938,411

UNITED STATES PATENT OFFICE 1,938,411

FREQUENCY CONTROL APPARATUS

Henry E. Warren, Ashland, Mass., assignor to Warren Telechron Company, Ashland, Mass., a corporation of Maine Application March 28, 1933. Serial No. 663,159

8 Claims. (Cl. 171—119)

My invention relates to apparatus for controlling the frequency of alternating current circuits in order that synchronous motor driven clocks supplied from such circuit will indicate accurate time. The apparatus includes a time standard, such as a master clock, with which the frequency of the regulated circuit is compared, and apparatus controlled in response to departure of the regulated circuit frequency from the time standard for correcting such frequency. An important object of the invention is to provide such controlling apparatus which is free from the troublesome problem known as hunting and which at the same time is quickly responsive to time errors in the regulated frequency. The invention is particularly suitable for controlling alternating current converting or generating apparatus of limited capacity used primarily for supplying isolated alternating current clock systems, such, for example, as might be installed in a large office building or on a large vessel, but the invention is not limited in this respect. The apparatus which is regulated will depend upon the nature of the energy supply which is available. The regulating principle employed is of general application, and while I will hereinafter explain the invention as applied to the regulation of a direct current motor alternating current generator set, I do so not with the intention of limiting my invention in this respect, but, rather, to explain one practicable application thereof.

Figure 1:
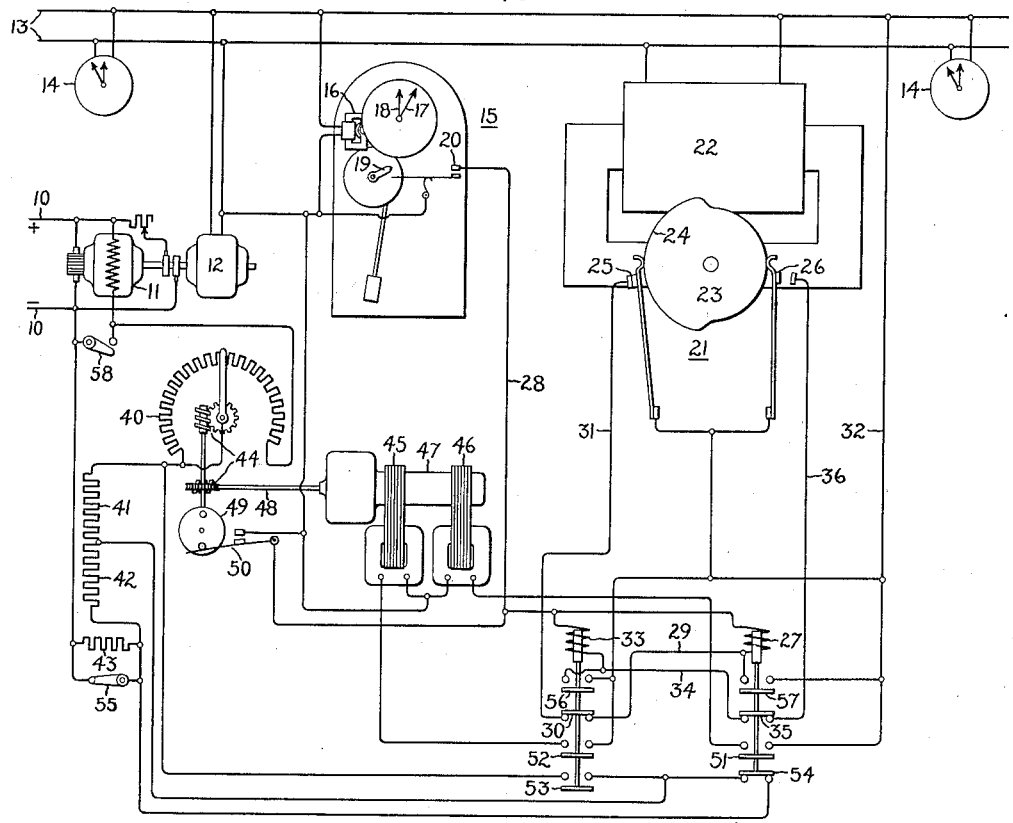
Figure 2:
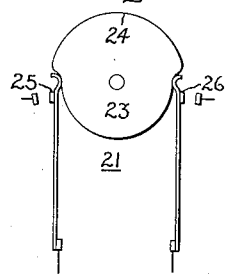

The features of the invention which are believed to be novel and patentable will be pointed out in the claims appended hereto. For a better understanding of the invention, reference is made in the following description to the accompanying drawing, showing in Fig. 1 a schematic diagram of the essential parts of one modification of my frequency regulating apparatus and the electrical connections by means of which the parts are associated in controlling relation, and Fig. 2 shows the neutral position of a time error detecting cam used in the apparatus of Fig. 1.

In the following description, it is assumed that there is available a direct current source of supply, represented at 10 in the drawing, and that we employ a motor generator set comprising a direct current motor 11 and an alternating current generator 12 to convert direct current energy into alternating current for supplying a clock system, represented at 13, to which various synchronous motor driven secondary clocks 14 are connected.

While a direct current shunt motor such as represented at 11 will run at a fairly uniform speed, regulation is necessary to eliminate the effects of small speed changes caused by voltage variations, changes in temperature, changes in load, etc., which will otherwise cause an error in the timing frequency of the clock system supplied by the synchronous generator 12. I do not mean that it is necessary to maintain the instantaneous speed of motor 11 and the instantaneous frequency of system 13 exactly constant, but that it is necessary to maintain the average speed of the motor generator set at a certain value so as to maintain the integrated frequency error of the clock system at a negligible value such that the clocks will indicate correct time within a fraction of a minute at all times. In accomplishing this result, it is, of course, desirable that timing errors be quickly detected and quickly corrected without hunting of the regulating apparatus.

The apparatus employed to accomplish these results comprises a standard of time, means for comparing the integrated frequency of the clock system with this standard of time at frequent intervals to detect timing errors and the direction thereof, and regulating apparatus controlled thereby which, generally speaking, does two things,—first, makes momentary changes in the speed, tending to quickly wipe out the integrated frequency error, and, second, makes a permanent speed adjustment that tends to prevent any further error from accumulating under the then existing conditions. The standard of time is represented at 15 and here comprises a contact making master clock. Any accurate clock or other chronometer may be used. I prefer to use a master clock such as is described in my United States Patent No. 1,502,-493, July 22, 1924, and shown in detail in Figs. 1 and 2 of said patent. This master clock comprises an accurate pendulum spring-driven clock, the spring of which is maintained wound by a synchronous motor which is here represented at 16. The pendulum clock drives a hand 17. The synchronous motor is also connected through a gear train to drive a hand 18 in the same direction as hand 17 is driven, and at the same rate when the frequency of the clock system, to which motor 16 is connected, is correct. Thus, when these hands are together and moving at the same rate, the integrated frequency error of the system is zero and the instantaneous frequency correct. If the frequency is low, hand 18 gradually falls behind hand 17, and if the frequency is high hand 18 gradually moves ahead of hand 17. The non-coincidence of these hands shows the direction and magnitude of any time error in the system as compared to the accurate spring clock. The hands are painted different colors to distinguish them. The accurate spring clock also operates an arm 19 one revolution per minute, which causes the momentary closure of a contact 20 once per minute. The hands 17 and 18 comprise a visual comparing means, but for automatic regulating purposes an electrical comparing means is desired.

The electrical comparing means comprises the time standard operated contact device 20 and a detector contact device 21 driven by a synchronous motor 22 connected to the clock system 13. The motor 22 drives a cam 23 one revolution per minute. The cam has a raised portion 24 over approximately half of its periphery. Two contact devices 25 and 26 have their movable members resting upon the periphery of the cam on opposite sides, and are so arranged that the contacts are closed when the raised portion of the cam is opposite a contact member, and open when the reduced portion of the cam is opposite a contact member. The arrangement is such that there is only one very short interval when both contacts are open, and this is shown in Fig. 2. In other positions of the cam, one or the other of the contacts is closed, but both contacts are never closed at the same time.

The cam rotates in a clockwise direction and is adjusted to the neutral position shown in Fig. 2 at the instant contact 20 of the master clock is closed, when the time error of the clock system is zero. It will now be evident that if the motor 22 slows down due to a negative time error, contactor 25 will be closed at the instant the time standard contactor 20 closes. Contactor 25 may, therefore, be referred to as the "slow" contact. If the motor 22 creeps ahead of the neutral position shown in Fig. 2, at the instant contactor 20 closes due to a position time error in the system, contactor 26 will be closed, and we may refer to this contactor as the "fast" contactor. The time standard contact at 20 is connected in circuit with contactors 25 and 26 in such a way as to produce "slow" or "fast" corrective current impulses. Thus, we have electrical means for comparing the time standard with system frequency for detecting time errors in the latter and the direction thereof.

Contactor 20 and the slow contactor 25, when both closed simultaneously, close the circuit of coil 27 of a "slow" relay. This circuit may be traced as follows,—from one side of the timing system through clock contact 20, line 28 to coil 27, line 29, switch bar 30 of a "fast" relay, line 31, "slow" contactor 25, to the opposite side of the clock system through line 32. Contactor 20 and the "fast" contactor 26 when both closed simultaneously close the circuit of coil 33 of a "fast" relay as follows,—from one side of the clock system through clock contact 20, line 28, coil 33, line 34, through switch bar 35 of the "slow" relay, line 36, "fast" contactor 26, line 32 to the opposite side of the clock system.

The "fast" and "slow" relays are used to control the resistance in the shunt field circuit of motor 11. The field resistance is divided into four sections 40, 41, 42 and 43. Section 40 of the field resistance is adjustable by a reversible motor device through suitable gear reduction indicated at 44. The reversible motor device comprises two self-starting synchronous motors 45 and 46, arranged, when energized, to drive their rotors, mounted on a common shaft within a casing 47, in opposite directions. The enlarged portion of this casing contains gear reduction between the motor rotors and the terminal shaft 48. This motor mechanism in addition to adjusting the portion 40 of the field resistance, rotates a cam, diagrammatically represented at 49, at the rate of approximately one revolution per minute when either motor is in operation. This cam operates a contact device 50, the purpose of which is to momentarily close a holding circuit, in parallel to clock contact 20, for the relay coils 27 and 33. The motor operated rheostat just described is used to make small permanent adjustments in the speed of motor 11. By permanent adjustments I mean adjustments which remain following an adjusting operation until a succeeding adjusting operation occurs. The field member of motor 46 is adapted to be connected to the clock system through a switch bar 51 of the "slow" relay when the latter is energized, and motor 46 will therefore operate the rheostat in the direction to increase the amount of resistance 40 which is contained in motor 11 field circuit to establish an increased speed setting thereof. Motor 45 is adapted to be connected to the clock system through a switch bar 52 of the "fast" relay when the latter is energized to perform the reverse operation to establish a decreased speed setting of motor 11.

Resistance section 41 contained in the field circuit of motor 11 may be termed a damping resistor. It is normally included in the field circuit, but is momentarily short-circuited by switch bar 53 of the "fast" relay when the latter is energized.

Resistance section 42 is another damping resistance which is normally short-circuited by a switch bar 54 of the "slow" relay, but is momentarily included in the field circuit when the "slow" relay is energized.

It is seen that resistance 41 and switch bar 53 reduce the speed of motor 11, and resistance 42 and switch bar 54 increase the speed of motor 11, when the "fast" and "slow" relays are respectively energized. These resistance sections and their control serve to produce temporary speed changes aimed to quickly wipe out integrated "fast" and "slow" time errors of the clock system.

Resistance section 43 is manually controlled by a switch 55, and is changed only under emergency conditions to quickly reduce the timing error of the system after a shut-down for example.

The upper switch bars 56 and 57 of the two relays are provided to close holding circuits for their respective coils 33 and 27 in parallel to the "fast" and "slow" contactors 26 and 25. The switch bars 30 and 35 of the relays provide an electrical interlock such that one relay cannot be energized while the other is energized.

In explaining the operation of the apparatus, it will first be assumed that the converting apparatus 11, 12 is in operation delivering correct frequency to the clock system, and that the integrated frequency error of the system is zero. The secondary clocks, therefore, are correct as compared to the master clock, and the hand 17, driven with the pendulum or time standard, is in coincidence with the hand 18 driven by the synchronous motor 16 connected to the clock system. Under these conditions, the double contact cam time error detecting device 21 which is driven by the synchronous motor 22 from the clock system will arrive at the neutral position shown in Fig. 2 at the instant contact 20 is closed by the master clock. It is understood that contact 20 is closed for only a few seconds. This happens once per minute in the example given, so it is seen that the comparison is made at frequent intervals. So long as the clock system remains correct no circuit is completed to the energizing coils 27 or 33 of the relays, and the relays and the regulating apparatus controlled thereby remain inactive, with the contact at 50 open.

It is next assumed that, due to changed conditions, the converting apparatus decreases slightly in speed, causing the clock system frequently to be slightly low. The synchronous motor driven detector 21 thus slows down by a corresponding amount so that the cam 23 gradually drops behind the neutral position represented in Fig. 2 when the time standard contact 20 closes. The "slow" contactor 25 is thus closed, as shown in Fig. 1, when contact 20 closes, and a circuit is momentarily closed through both contacts, which energizes the "slow" relay coil 27. The relay picks up and closes a holding circuit for itself in parallel with contact 25 through bar 57. Motor 46 is energized through bar 51 and starts, immediately closing the contact at 50, which closes a holding circuit for the "slow" relay in parallel with clock contact 20. Thus, an energizing circuit to relay coil 27 is established which is now independent of either contact 20 or contact 25, and the relay remains energized for approximately one-half minute, in the example given, until cam 49 makes a half revolution and opens the holding circuit at contact 50, whereupon the relay drops out.

Two speed correcting operations are initiated by the closing of the "slow" relay. One of these operations is a small "increased speed" adjustment of the resistance section 40, which adjustment remains after the "slow" relay opens. The other operation is a greater but temporary "increased speed" adjustment that lasts only for the duration of closure of the "slow" relay by momentarily opening the short circuit around damping resistance section 42 at switch bar 54. The first or permanent small speed adjustment is aimed to correct the speed of the converting apparatus so that after the "slow" relay opens the instantaneous frequency of the clock system will be correct. The second or temporary larger speed adjustment is aimed to wipe out the integrated frequency error of the system and correct the secondary clocks.

It will be evident that if we attempt to correct both types of errors by a permanent adjustment of resistance section 40 alone, it would be necessary to permanently increase the instaneous frequency above its correct value, which eventually would produce an error in the opposite direction and result in undesirable hunting of the regulating apparatus and continuous plus and minus time errors. By establishing the two types of regulation simultaneously as described above in the proper proportion, all hunting tendency of the regulating apparatus is removed, yet prompt and effective correction is made. In case one such correction operation is insufficient, the time comparing and error detecting apparatus will initiate a second correcting operation. These correcting operations will follow each other one minute apart and will last approximately one-half minute in the example given until the timing system is again correct.

In case of a positive integrated frequency error the detecting cam 24 advances beyond the neutral position as the clock contact 20 closes, and this sends an impulse through the "fast" contact 26, energizing the "fast" relay coil 33. Motor 45 permanently adjusts the resistance 40 to slightly reduce the speed, and switch bar 53 momentarily short-circuits resistance section 41, tending to wipe out the plus integrated frequency error, while the "slow" relay and motor 46 remain idle. Cam 49 performs the same result of closing contact 50 for approximately one-half minute for either direction of rotation and stopping the corrective operation at the end of such interval. The complete operation of the apparatus for correcting positive frequency errors is otherwise similar to that described above for correcting negative error.

It will be understood that various adjustments may be made to suit different conditions and types of converting apparatus employed. For example, the duration of contact at 20 with respect to the time the cam 23 is in a neutral position may be changed so as to be more or less sensitive with respect to detecting time errors. The duration of a regulating operation may be increased or decreased by changing the time the contact at 50 remains closed, and the various resistance sections 40, 41 and 42 may be changed and other forms of regulating devices may be substituted, depending upon the nature of the apparatus used to supply the clock system.

It is, of course, possible under emergency conditions to have such a large change in speed occur that the error accumulates faster than the apparatus can make corrections. When the accumulated error amounts to about thirty seconds or more in the arrangement as hereinbefore described, the mechanism falls out of step and manual adjustment must be resorted to, as by inserting resistor 43 or short-circuiting all the field resistance by a switch 58 until the error has been reduced to a value where it can be taken care of by the automatic apparatus.

In accordance with the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In combination, apparatus for supplying alternating current, adjustable means therefor for varying the frequency supplied, means for comparing the integration of the frequency supplied with standard time, means operated by said comparing means for transmiting electrical impulses at frequent intervals only when there exists an integrated frequency error as determined by said comparing means, and controlling devices responsive to said impulses for adjusting the means for varying the frequency in a direction to correct for the integrated frequency error, each such adjusting operation effecting a predetermined permanent adjustment and a predetermined temporary adjustment of the frequency varying means.

2. Apparatus for supplying regulated frequency, comprising means for supplying alternating current, adjustable means therefor for varying the frequency, means for detecting errors in the integrated frequency supplied and the direction thereof, circuit control means operated by said error detecting means for transmitting periodic current impulses only when there exists a positive or negative integrated frequency error, means set into operation by such impulses for permanently adjusting the frequency varying means by a limited amount and temporarily adjusting the frequency varying means by a larger amount in a direction to reduce the error, and timing means for maintaining said adjustable means in operation for a definite interval of time less than the time between consecutive impulses.

3. Apparatus for supplying regulated frequency alternating current, comprising apparatus for converting electric energy into alternating current of the desired frequency, adjustable resistance means associated with said converting apparatus by means of which the frequency of the alternating current supplied thereby may be controlled, a time standard, a synchronous motor supplied from said converting apparatus, contact making and breaking devices operated by said time standard and by said synchronous motor at frequent cyclic intervals and in synchronous relation when the instantaneous frequency supplied to said synchronous motor remains at the desired value, a pair of control circuits energized through said contact devices connected in series relation, the series contacts in both control circuits being closed at different times when the integrated frequency error is zero, the series contacts in one control circuit being closed simultaneously when the integrated frequency error is positive, and in the other control circuit when the integrated frequency error is negative, and means responsive to the energization of either control circuit for making two adjustments of said resistance means in a direction to correct the frequency, one adjustment being relatively small but permanent, and the other adjustment being relatively large but temporary, both adjustments being completed before the next cycle of operation of said contact devices.

4. Apparatus for supplying regulated frequency alternating current, comprising apparatus for delivering alternating current having adjustable means for varying the frequency thereof, a time standard and a synchronous motor supplied from the alternating current apparatus for comparing the frequency of the alternating current delivered with standard time, a pair of control circuits, contact devices in said control circuits operated at frequent cyclic intervals by said time standard and synchronous motor in synchronous relation when the instantaneous frequency is correct and serving to momentarily energize only one control circuit when the integrated frequency error is positive and to momentarily energize only the other control circuit when such error is negative, and means set into operation by the energization of either control circuit for making two frequency correcting adjustments in the frequency varying means of the alternating current apparatus, one adjustment being permanent and tending to correct instantaneous frequency, and the other adjustment being temporary but of relatively larger value and tending to correct the integrated frequency error, both adjustments being completed before the next cycle of operation of said contact devices.

5. Apparatus for supplying regulated frequency, comprising alternating current supply apparatus together with variable resistance means associated therewith for varying the frequency, means for detecting integrated frequency errors in the alternating current supplied and the direction thereof, circuit controlling means operated by said error detecting means for transmitting current impulses of frequent duration when there exists a positive or negative error in the integrated frequency, a pair of relays selectively energized by said impulses depending on the direction of the error, timing means set into operation by the operation of either relay for maintaining the relay energized for a definite length of time less than the time between consecutive impulses, and two means responsive to the operation of a relay for adjusting said resistance means in a direction to reduce the error, one adjustment being relatively small but permanent and the other adjustment being relatively large but temporary.

6. Means for supplying regulated frequency alternating current, comprising alternating current supply apparatus, a circuit including adjustable resistance associated with the supply apparatus by means of which the frequency of the alternating current supplied may be varied, means for detecting positive and negative errors in the integrated frequency supplied, circuit control means operated by the detecting means for transmitting momentary current impulses of frequent duration only when there is detected a positive or negative frequency error, a pair of relays selectively energized by said current impulses, depending upon the sign of the error, a motor operated rheostat controlling a portion of said adjustable resistance and operated in a direction to correct the error during the energization of either relay, means for maintaining either relay energized for a definite length of time less than the time between consecutive impulses, a short circuit about another portion of said resistance, which is closed only during the time one relay is energized, and a short circuit about another portion of said resistance which is open only during the time the other relay is energized.

7. Apparatus for supplying regulated frequency alternating current, comprising alternating current supply apparatus having adjustable means for varying its frequency, a clock operated contact device periodically closed for a few seconds during consecutive predetermined intervals of time, such as a minute, a pair of contact devices driven by a synchronous motor energized from said supply apparatus to be alternately closed at different times once during said predetermined interval of time when the instantaneous frequency is at the desired value, there being a few seconds in each such interval when neither of said pairs of contacts is closed, said clock and synchronous motor driven contact devices being so adjusted that the clock contact is made when both contacts of the pair are open only when the integrated frequency error of the supply is zero or approximately zero, means initially energized through the clock contact and one of the pairs of contacts for controlling said adjustable means to reduce the frequency of the supply apparatus, and means initially energized through the clock contact and the other of said pair of contacts for controlling said adjustable means to increase the frequency of the supply apparatus.

8. Apparatus for supplying regulated frequency alternating current, comprising alternating current supply apparatus having means associated therewith for controlling the frequency supplied, a clock operated contact which is closed only for a few seconds during consecutive predetermined intervals of time, such as a minute, a synchronous motor energized by said supply apparatus, a cam driven by said motor to make one revolution in said predetermined time interval when the instantaneous frequency is at the desired value, a pair of contact devices on opposite sides of said cam arranged to be alternately closed at different times for each revolution of the cam, there being a few seconds during each cycle of operation when both contacts of the pair are open, the cam being adjusted with respect to the clock contact so that the latter is closed when the pair of contacts are both open when the integrated frequency error of the supply is substantially zero, a pair of control circuits energized through said pair of contacts and through said clock contact such that periodic impulses are produced in one circuit or the other only when there exists a positive or negative integrated frequency error, and control devices, the operation of which is initiated by such impulses, for adjusting the frequency control means of the supply apparatus to correct for integrated frequency errors.

HENRY E. WARREN.